United States Patent
Schneider et al.

(10) Patent No.: US 8,517,308 B2
(45) Date of Patent: *Aug. 27, 2013

(54) STORAGE COMPARTMENT MODULE WITH MOBILE STORAGE COMPARTMENT

(75) Inventors: Uwe Schneider, Jork (DE); Thorsten Gerber, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,090

(22) Filed: Apr. 30, 2012

(65) Prior Publication Data

US 2012/0228426 A1 Sep. 13, 2012

Related U.S. Application Data

(63) Continuation of application No. PCT/EP2010/065799, filed on Oct. 20, 2010.

(60) Provisional application No. 61/280,165, filed on Oct. 30, 2009.

(30) Foreign Application Priority Data

Oct. 30, 2009 (DE) .......... 10 2009 051 363

(51) Int. Cl.
  *B64D 11/00* (2006.01)
(52) U.S. Cl.
  USPC ............. 244/118.5; 244/118.6; 244/118.1
(58) Field of Classification Search
  USPC ................ 244/118.1, 118.5, 118.6
  See application file for complete search history.

(56) References Cited

U.S. PATENT DOCUMENTS

| | | | | |
|---|---|---|---|---|
| 5,383,628 | A * | 1/1995 | Harriehausen et al. | 244/118.1 |
| 5,549,258 | A * | 8/1996 | Hart et al. | 244/118.1 |
| 5,556,332 | A * | 9/1996 | Schumacher | 454/76 |
| 5,651,733 | A * | 7/1997 | Schumacher | 454/76 |
| 5,687,929 | A * | 11/1997 | Hart et al. | 244/118.1 |
| 5,716,027 | A * | 2/1998 | Hart et al. | 244/118.1 |
| 5,842,668 | A * | 12/1998 | Spencer | 244/118.1 |
| 5,921,670 | A * | 7/1999 | Schumacher et al. | 362/480 |
| 6,454,209 | B1 * | 9/2002 | Bock et al. | 244/118.5 |
| 6,619,716 | B1 * | 9/2003 | Sturt | 296/37.8 |
| 6,633,347 | B2 * | 10/2003 | Kitazawa | 348/837 |
| 6,874,730 | B2 * | 4/2005 | Harasta | 244/118.5 |
| 7,258,406 | B2 * | 8/2007 | Stephan et al. | 312/246 |
| 7,379,125 | B2 * | 5/2008 | Chang | 348/837 |
| 8,028,957 | B2 * | 10/2011 | Wolf et al. | 244/118.5 |
| 2001/0011692 | A1 * | 8/2001 | Sprenger et al. | 244/118.5 |
| 2004/0212746 | A1 * | 10/2004 | Rosen | 348/837 |

(Continued)

FOREIGN PATENT DOCUMENTS

| | | |
|---|---|---|
| DE | 29907980 U1 | 7/1999 |
| DE | 102004043910 B4 | 5/2007 |
| DE | 102007030331 A1 | 1/2009 |
| DE | 102008026116 A1 | 12/2009 |

(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

A hatrack module with a moveable hatrack comprises a housing with a hatrack accommodation space, a hatrack with laterally arranged guide elements and optionally at least one passenger service unit, wherein each guide rail is arranged on one sidewall of the hatrack accommodation space, and wherein the guide elements of the hatrack can be made to engage the guide rails on the housing.

12 Claims, 6 Drawing Sheets

(56) References Cited

U.S. PATENT DOCUMENTS

| | | | |
|---|---|---|---|
| 2006/0091257 A1* | 5/2006 | Melberg et al. | 244/118.5 |
| 2007/0095980 A1* | 5/2007 | Bock | 244/118.1 |
| 2008/0191093 A1* | 8/2008 | Benkart et al. | 244/118.1 |
| 2011/0240796 A1* | 10/2011 | Schneider | 244/118.5 |
| 2012/0228425 A1* | 9/2012 | Schneider et al. | 244/118.5 |
| 2012/0228426 A1* | 9/2012 | Schneider et al. | 244/118.5 |

FOREIGN PATENT DOCUMENTS

| | | |
|---|---|---|
| DE | 102008051240 B3 | 9/2010 |
| DE | 19946629 B4 | 5/2012 |
| EP | 861781 B1 | 8/2003 |
| EP | 1216920 B1 | 8/2003 |
| EP | 1293383 A4 | 1/2006 |
| WO | 20090003945 A1 | 1/2009 |
| WO | 2010040776 A4 | 9/2010 |

* cited by examiner

STORAGE COMPARTMENT MODULE WITH MOBILE STORAGE COMPARTMENT

CROSS-REFERENCE TO RELATED APPLICATIONS

The present application is a continuation of International Application No. PCT/EP2010/065799, filed Oct. 20, 2010, published in German, which claims the benefit of the filing date of U.S. Provisional Patent Application No. 61/280,165 filed Oct. 30, 2009 and of German Patent Application No. 10 2009 051 363.9 filed Oct. 30, 2009, the disclosures of which applications are hereby incorporated herein by reference.

TECHNICAL FIELD

The invention relates to a hatrack module, and to a method for installing the aforesaid. In particular, the invention relates to a hatrack module with a hatrack. Furthermore, the invention relates to the use of a hatrack module in an aircraft or vehicle, and to an aircraft comprising a hatrack module.

BACKGROUND TO THE INVENTION

At present no moveable lateral hatracks are known for passenger aircraft of the type A320. This is originally due to the available space with the respective cross sections not allowing generous arrangements with pivoting regions. In order to allow adequate pivoting of a hatrack on the aircraft X-axis, in a hatrack with a simple bearing arrangement the aircraft fuselage would have to be broken open. This means that the aircraft fuselage would have to deviate too much from its ideal circular shape. Pivotally held hatracks comprising a simple bearing arrangement are known from the A380 and the A350. Due to the larger fuselage diameter, in these aircraft the problem of the required pivoting region does not take center stage; however, in these aircraft the pivot point is in part removed from the center of gravity to such an extent that manual forces and ergonomics are limited.

Furthermore, the present-day installation sequence of passenger service units commences, after the hatracks have been mounted, with clicking into place the locking devices on the fuselage side into the so-called PSC rails, wherein the aforesaid are then connected to the functional panels, the electrical connectors and the air connections, which as a rule are held on the underside of the hatracks or directly on the structure of the aircraft.

DE 10 2007 030331 A1 and WO 2009 003945 A1 describe a hatrack module for an interior of an aircraft, wherein the hatrack module comprises at least one container and at least one housing for accommodating the container, and wherein at least one passenger service channel is integrated in the housing.

PRESENTATION OF THE INVENTION

It is an object of the invention to provide a hatrack module that is easier to install. Furthermore, it is an object of the invention to make it possible to more easily operate a hatrack of a hatrack module.

These and further objects are met by the subject-matter of the respective independent claims. Further embodiments are described in the respective dependent claims.

Generally-speaking, a hatrack module according to the invention comprises a housing with a hatrack accommodation space and a hatrack with laterally arranged guide elements, wherein in each case a guide rail is arranged on the sidewalls of the hatrack accommodation space, and wherein the guide elements of the hatrack can be made to engage the guide elements on the housing.

In this arrangement the guide elements provided on the respective sides of the hatrack can engage a single guide rail for each side of the hatrack accommodation space.

The hatrack can be moved between an open and a closed position along the guide rails in such a manner that at least in some sections no external force is necessary to move the hatrack. In other words, the manual force exerted by a passenger of an aircraft to activate the hatrack in the course of the movement path of the hatrack can be reduced or even cancelled as a result of the weight force of the hatrack, including the items contained in the hatrack. A passenger can thus gain the impression in part not to need any force at all to open or close the hatrack. Operating the hatrack is thus facilitated to a significant extent.

According to a further embodiment of the invention, each guide rail comprises a first guide segment, a connection segment, a second guide segment and an installation segment.

According to a further embodiment of the invention, in the installed state on each side of the hatrack a first roller on the hatrack can engage a first guide segment of the corresponding guide rail, and a second roller on the hatrack can engage a second guide segment of this guide rail.

In other words, the movement of the hatrack between an open position and a closed position is implemented by means of a cam mechanism that is designed by way of two rollers and a single corresponding rail.

The fact that on each side of the hatrack only a single guide rail is provided that is open towards the passenger compartment of an aircraft is associated with an advantage in that following fastening of the housing of the hatrack module to an aircraft wall, and following insertion of a PSU into the optionally provided passenger service channel, a hatrack can be installed, for example by inserting the rollers located on the hatrack sides into the corresponding guide rails of the housing. In this arrangement, so-called insertion inclines on the guide rails can support one-person installation of the hatrack.

In the case of a hatrack with a moveable pivot point, which hatrack makes it possible to achieve space-saving movement between two ideal end positions, the hatrack module according to one embodiment of the invention makes it possible to implement a complex movement path on a closed rail (one rail per side), with two bearing points (ball-bearing mounted polyamide rollers). Since the rails can be designed to lead out of the respective edge surface at the housing sides, simple one-person installation of the roller-guided hatrack by way of self-positioning (insertion inclines) on the rails is possible.

The movement path during opening (first phase) can be selected in such a manner that at first the pivot point is away from the center of gravity towards the structural side in order to ensure guaranteed and quick automatic opening of the hatrack, wherein said pivot point moves continuously towards the center of gravity. The further movement path during opening can be selected so that the pivot point continuously approaches the center of gravity in order to prevent further gravity-induced acceleration.

The further movement path during opening (second phase) can result in a change in the pivot point beyond the center of gravity in the direction towards the passenger. During this process the speed of the hatrack is reduced in order to deplete the kinetic energy prior to reaching the end position.

The further movement path during opening (third phase) can then be selected in such a manner that the pivot point moves back over the center of gravity towards the structural side in order to ensure a safe and secure bearing arrangement of the chute in its fully-opened end position.

During closing, this very change in the pivot point can be perceptibly overcome again as feedback or resistance. The movement path during closing can be selected in such a manner that, after this resistance has been overcome, the pivot point moves away from the center of gravity towards the structural side, in other words the weight of the hatrack supports passengers in their attempt to overcome gravity. The further movement path up to final closing can, furthermore, be selected in such a manner that after a certain kinetic energy has been attained in the previous acceleration phase, final closing can be effected with little manual force.

According to a further embodiment of the invention, the hatrack module further comprises a locking plug that is suitable for closing off one end of a guide rail, wherein the locking plugs could be conical locking plugs so as to correspond to any insertion inclines at the ends of the guide rails. Furthermore, the locking plugs can be held by means of grub screws, and can comprise rubber buffers to provide end-stop damping.

According to a further embodiment of the invention, the hatrack module furthermore comprises a locking device so that the hatrack can be locked in a closed position in the housing.

According to a further embodiment of the invention, the movement path of the hatrack is determined in such a manner by means of the guide rails that during opening or closing the hatrack, i.e. in any position of the hatrack between an open position and a closed position, there is an essentially constant gap between an outside of the hatrack and an edge of the hatrack housing. In this way it can be ensured that in any position of the hatrack relative to the hatrack housing a uniform visual transition between the hatrack and the hatrack housing, and also the interior lining panels, exists. Furthermore, it is ensured that the rearward-arranged elements and structures of the hatrack module are at no time visible.

The hatrack, the hatrack housing and the guide rails can also match each other in such a manner that on all sides of the hatrack, in other words on the lateral, on the upper, and on the lower outer sides, there is a constant gap so that apart from the visual aspects, air cushioning of the movement of the hatrack is also provided.

This means that the hatrack accommodation space generates an air buffer when the hatrack is moved from an open position to a closed position, because the air situated behind the hatrack cannot escape quickly enough through the gap between the hatrack and the hatrack housing. On the other hand, air cannot flow quickly enough into the hatrack accommodation space when the hatrack is moved from a closed position to an open position, and consequently in this process, too, the movement is gently decelerated or cushioned.

According to a further embodiment of the invention, the hatrack module is designed so that it can be integrated in a positive-locking manner in the lining of the interior of an aircraft.

Moreover, the hatrack module can further comprise a passenger service channel and at least one passenger service unit, wherein the at least one passenger service unit can be an oxygen supply box, a loudspeaker, a headphone jack, a light, an air outlet for the air supply, a USB connector, a computer connector, and/or a panel.

It should be pointed out that reach-through access openings can be provided in the housing, which reach-through access openings allow further improved installation of the hatrack module and in particular of the passenger service units (PSUs), wherein these openings and also cables and hoses of the PSUs and the rear of the latter are no longer visible to passengers after installation of the hatrack, wherein no acoustic disadvantages are to be expected as a result of the closed contour of the side panels with the passenger service channel, with the hatrack module housing and with the hatrack to the ceiling lining, and wherein maintenance work on the PSUs merely requires deinstallation of the hatrack, a task that can be accomplished by one person in a matter of seconds.

According to a further aspect of the invention, a method for installing a hatrack module as described above comprises the following steps: attaching the housing of the hatrack module to the structure of the aircraft; inserting the first rollers into the installation segments of the guide rails; inserting the hatrack into the hatrack accommodation space, wherein the first rollers move along the guide rails; inserting the second rollers into the installation segments; and further inserting the hatrack until the first rollers are arranged in the first guide segments and the second rollers are arranged in the second guide segments.

It should be mentioned that embodiments of the invention are described with reference to various objects. In particular, some embodiments are described with reference to method-related claims, whereas other embodiments are described with reference to device-related claims. However, from the description above and below, the average person skilled in the art will gather that, unless otherwise determined, in addition to any combination of features that forms part of one type of objects, also any combination of features relating to the different objects is deemed to have been disclosed in this document.

The aspects described above, and further aspects, features and advantages of the invention can also be gathered from the examples of the embodiments, which are described below with reference to the accompanying drawings.

DETAILED DESCRIPTION OF THE EMBODIMENTS

In contrast to the very time-consuming and ergonomically unsatisfactory installation of a complete hatrack module with a subsequently-to-be-installed service channel (or with a complete, pre-configured, hatrack module) in the present case the installation sequence is divided into two logical process steps according to the specific requirements of hatrack installation in a confined aircraft fuselage and the necessary individual equipment level of the service channel.

As a result of improved access, these process steps are considerably sped up, and can be carried out in a position that facilitates this work. For example, maintenance work on the PSUs merely requires deinstallation of the hatrack, a task that can be accomplished by one person in a matter of seconds.

Figure 1:
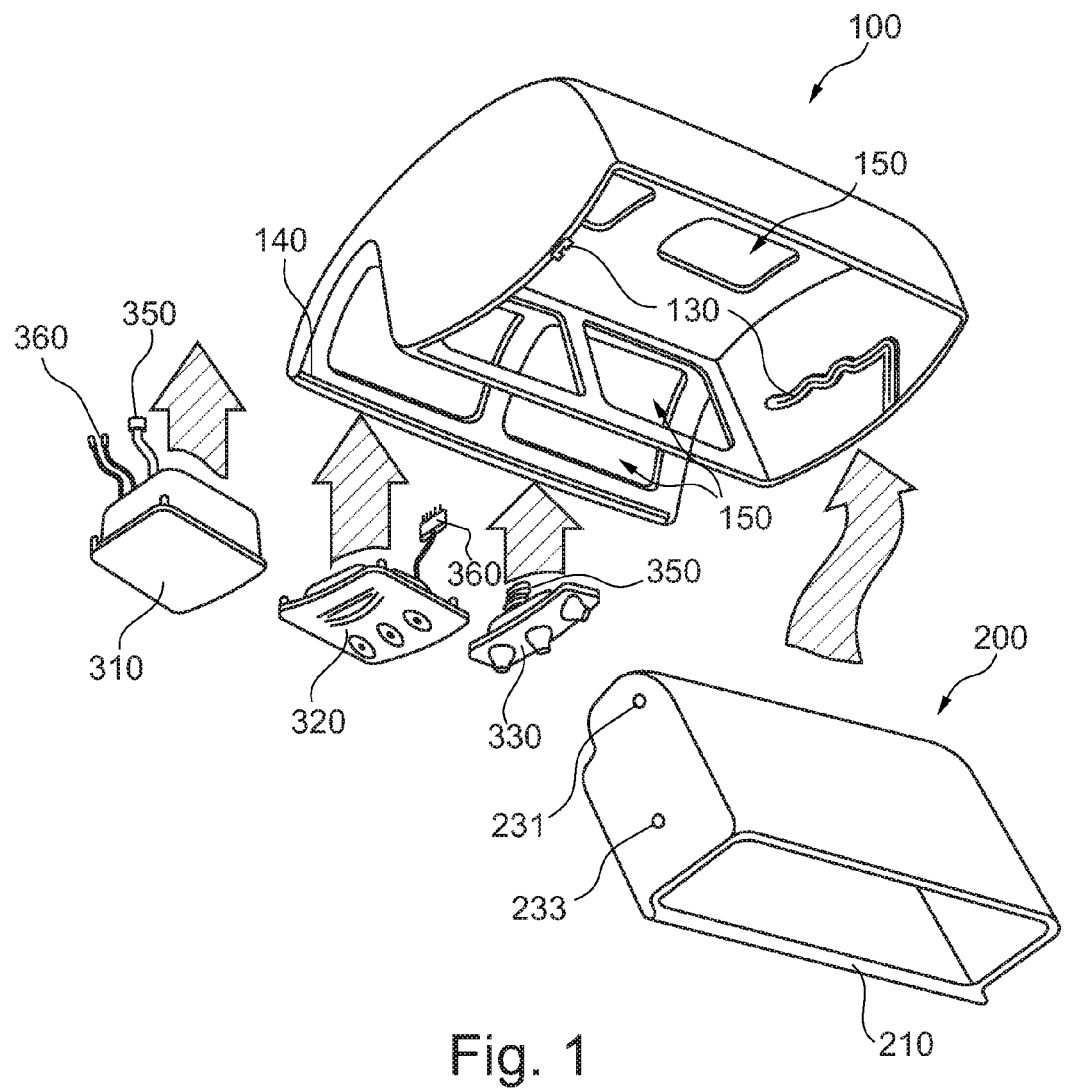
FIG. 1 shows a disaggregated component drawing of a hatrack module with a housing, with PSUs and with a hatrack according to one embodiment of the invention.

FIG. 1 shows an isometric disaggregated component drawing of a hatrack module according to the invention. The hatrack module shown has an integral service channel and comprises a fixed (rigid) hatrack module housing 100, designed as a drawer housing (sandwich) or carrier housing (metal or CFRP) for accommodating the guide rails 130 for the hatrack, and for accommodating the passenger service channel (PSC) rails 140 for the passenger service units 310, 320, 330 (PSUs). Generous reach-through openings 150 for reaching the fastening elements for installation to the aircraft structure are to considerably facilitate installation and alignment of the housing 100. Generous reach-through access openings 150 in the housing towards the service channel are designed to make it possible to simply and ergonomically connect the PSUs to the electrical connections, oxygen connections and individual air connections at eye height.

The hatrack 200 itself, in particular with its wall 210, represents the visible part towards the cabin; in its installed state said hatrack 200 covers up all the cables and hoses of the PSUs and their rear as well as the kinematics (guide rails and rollers) by a corresponding geometric design. The hatrack comprises a drawer housing (sandwich) with a total of four rollers 231, 233 to be held in the guide rails 130 of the housing. The PSUs functionally correspond to the commonly used components in the cabin, except they provide an advantage in that neither hinges for folding nor excess cable lengths or hose lengths with corresponding abrasion protection sleeves and their separate mounts for fastening are required in their application.

The described hatrack combines implementation of a complex movement path on a closed rail (one rail each side) in each case with two bearing points (ball-bearing mounted polyamide rollers). Although this is a complex movement of the hatrack, maximum reduction in the number of individual components is achieved by the integration of all the desired functions in the design shape of a single component (guide rail). This guide rail itself is present twice for each hatrack module, namely offset in longitudinal direction of the aircraft, in each case as a fixed bearing and as a floating bearing, an arrangement which also makes it possible to provide hatracks over several aircraft frame elements. Since these guide rails lead from the edge surface at the housing sides, simple one-person installation of the roller-guided hatracks by way of self-positioning (insertion inclines) on the rails is possible.

Figure 2:
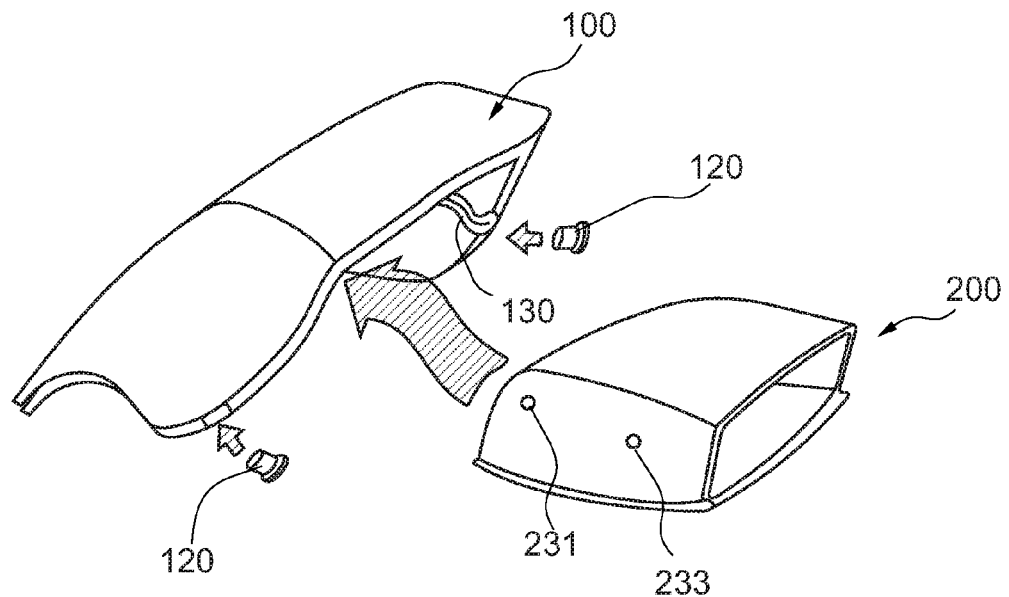
FIG. 2 shows an isometric view of a hatrack prior to installation in a housing of a hatrack module.

As shown in the isometric view in FIG. 2, the rails 130 are closed off in each case by means of a locking- and end-stop-plug 120, in each case held by locating screws, as soon as the guide rollers 230 of a hatrack 200 have been inserted into the guide rails 130.

For additional damping and to provide an end stop, the end-stop plugs can comprise an elastic buffer. Since the housing can be installed on the aircraft structure separately of the hatrack, fastening of the housing is significantly facilitated, for example through installation openings on the rear wall. After installation of the hatrack, these installation openings and the entire inner workings of the hatrack module, which also acts as a visible part, are hidden from view.

Figure 3:
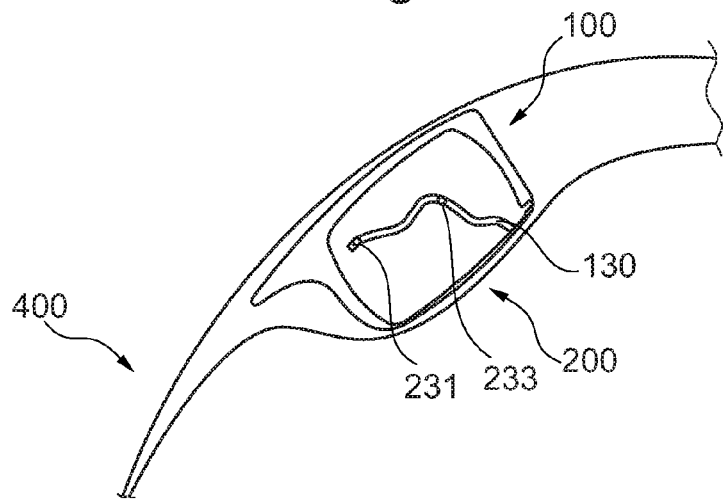
FIG. 3 shows the arrangement of guide rollers on a hatrack in a guide rail.
Figure 4:
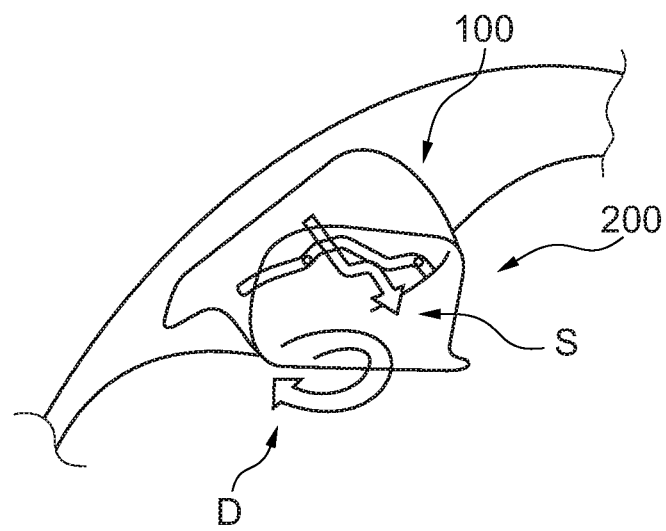
FIG. 4 shows a diagrammatic view illustrating the movements of the hatrack between the closed position and the open position.

In terms of its end position, the guide rail 130 is designed in such a manner that the closed end position is a position as close as possible to the fuselage (compare FIG. 3), while the open position is a position where loading is made as easy as possible (compare FIG. 4). The design is thus suitable to optimize the pivoting movement, and to minimize dead space (pivoting regions), as well as to provide as generous as possible a cabin in an aircraft.

Figure 5:
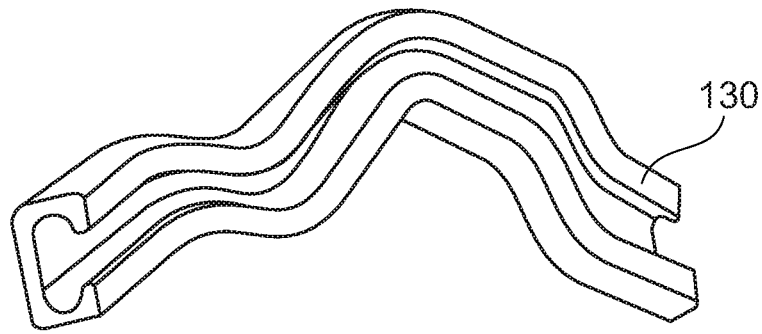
FIG. 5 shows an isometric view of an exemplary guide rail.

However, in the hatrack module with slide-in guide rails described in this document, particular attention has been paid to the defined curve design (compare FIG. 5).

Figure 6:
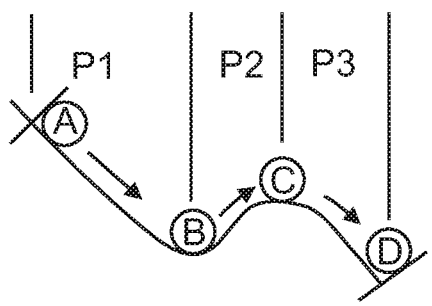
FIG. 6 illustrates the different phases during opening of a hatrack according to the invention.

The movement path during opening (compare phase P1 in FIG. 6) has been selected in such a manner that at first the pivot point is away from the center of gravity towards the structural side in order to ensure guaranteed and quick automatic opening of the hatrack, wherein said pivot point moves continuously towards the center of gravity. The further movement path during opening has been selected so that the pivot point continuously approaches the center of gravity in order to prevent further gravity-induced acceleration.

The further movement path during opening (phase P2 in FIG. 6) results in a change in the pivot point beyond the center of gravity in the direction towards the passenger. During this process the speed of the hatrack is reduced in order to deplete the kinetic energy prior to reaching the end position.

The further movement path during opening (phase P3 in FIG. 6) is then selected in such a manner that the pivot point moves back over the center of gravity of the structural side in order to ensure a safe and secure bearing arrangement of the hatrack in its fully-open end position.

During closing, this very change in the pivot point must be perceptively overcome again as feedback or resistance. The movement path during closing is selected in such a manner that after this resistance has been overcome the pivot point moves away from the center of gravity towards the structural side; in other words the weight of the hatrack supports passengers in their attempt to overcome gravity.

The further movement path to the final closed position is, furthermore, selected in such a manner that after certain kinetic energy has been attained in the previous acceleration phase, final closing can be effected with little manual force. By utilizing the kinetic energy, the required manual forces thus remain within comfortable limits The physical effect that is harnessed in this arrangement is essentially explained by defined interaction between potential and kinetic energy (compare FIG. 6).

Figure 7:
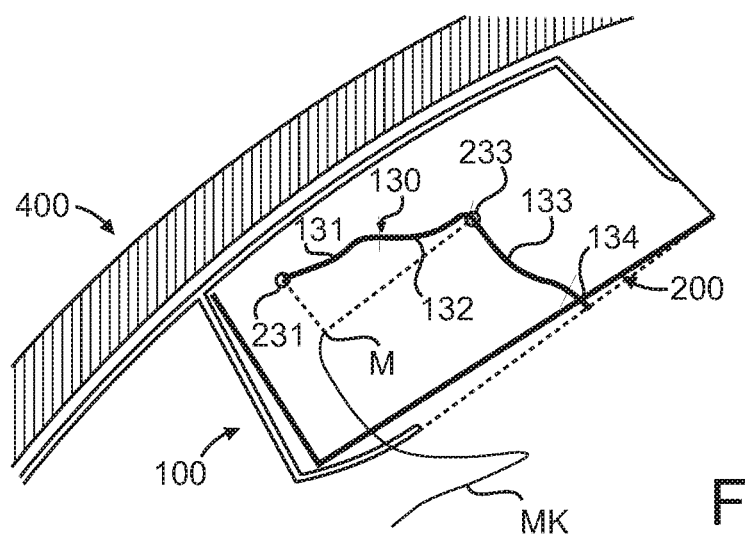
FIG. 7 shows a diagrammatic view of a closed hatrack.
Figure 8:
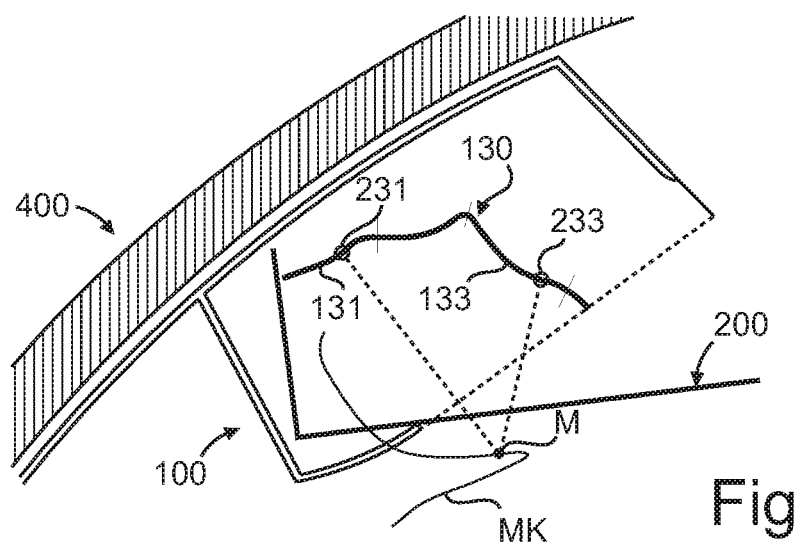
FIG. 8 shows a diagrammatic view of a partly opened hatrack.
Figure 9:
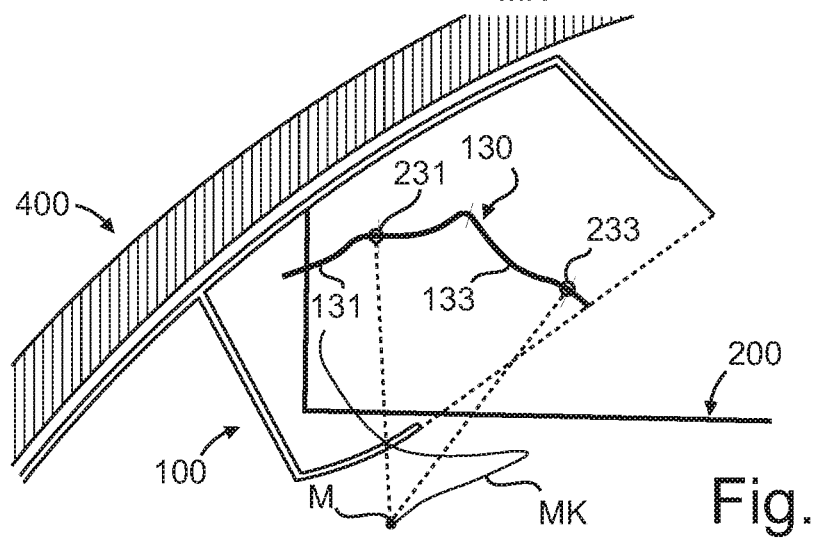
FIG. 9 shows a diagrammatic view of an open hatrack.

The above-described aspects of movement of the hatrack are shown in another manner in FIGS. 7 to 9. FIGS. 7, 8 and 9 in each case show part of the structure 400 to which the housing 100 of the hatrack module is fastened. The diagram also shows a guide rail 130 that comprises the following segments: a first guide segment 131 which can be engaged by a first roller 231 of a hatrack 200; a connection segment 132 through which the first roller 231 runs when the hatrack 200 is mounted or installed; a second guide segment 133 through which the first roller 231 runs during installation, which second guide segment 133 can be engaged by a second roller 233 of the hatrack 200; and finally an installation segment 134 that is designed so as to be open towards the front so that the first and subsequently the second roller can be inserted into the guide rail 130 during installation.

FIG. 7 shows the hatrack in its closed position. FIG. 8 shows the hatrack in a partially open position. FIG. 9 shows the hatrack in its completely open position. Furthermore, the figures show the curve of instantaneous center of rotation MK and the instantaneous center of rotation M of the respective position. This demonstrates that the actual pivot point of a particular position of the hatrack in the course of the movement of the hatrack moves, along the curve of instantaneous center of rotation, between the closed position and the open position. The shape of the curve of instantaneous center of rotation MK illustrates that during movement of the hatrack a changed tilting movement is implemented.

Figure 10:
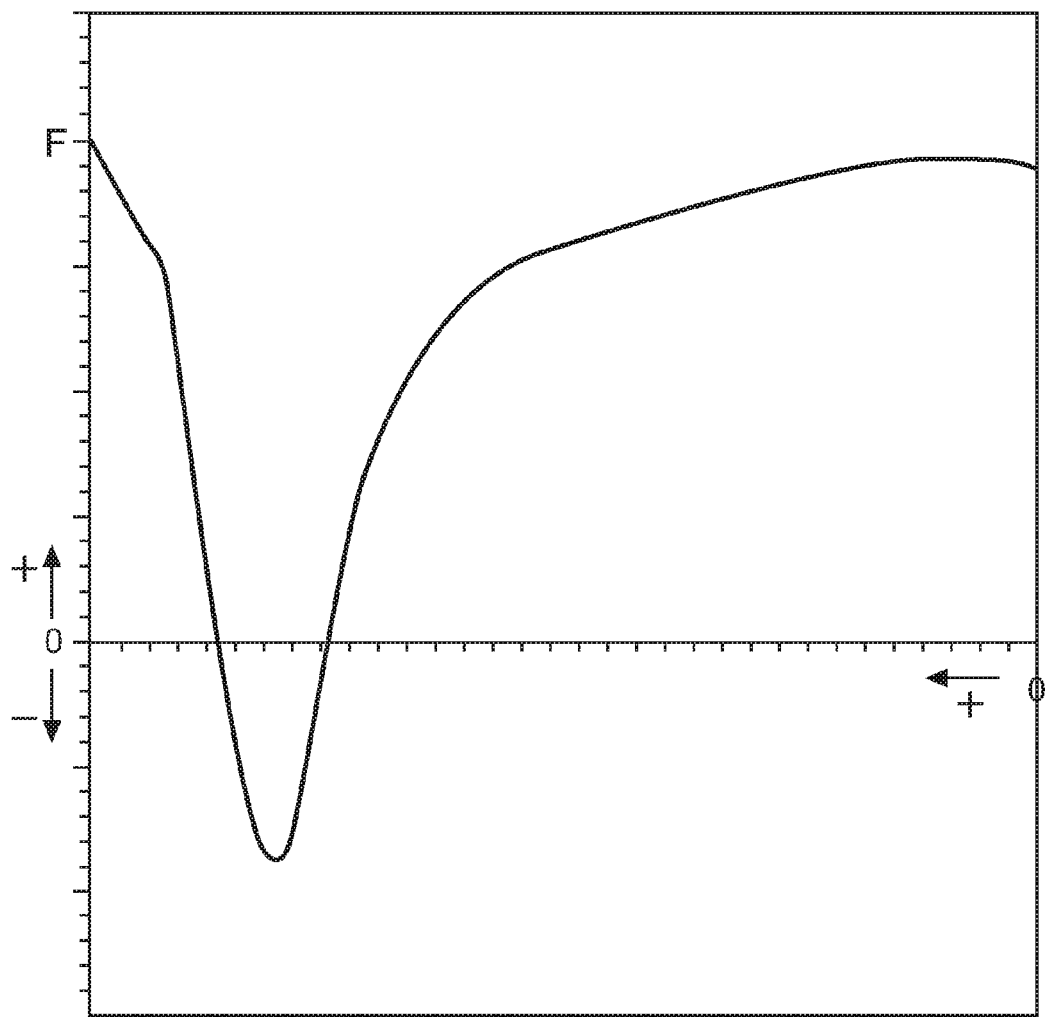
FIG. 10 shows a diagram that illustrates the connection between the opening angle and the force necessary for further movement.

As a result of this changed tilting movement, the force to be exerted, in other words the manual force, varies depending on the position of the hatrack. FIG. 10 shows an exemplary curve shape of the force F projected over the opening angle α. In the example shown, the force necessary to operate the hatrack even becomes negative in one section. Thus, in this section the hatrack moves independently without the need for a force to be applied from the outside. Depending on the actual geometric shape of the hatrack, and in particular depending on the load or the items contained in the hatrack, the curve will change or shift. However, qualitatively, the force becomes less in any case, and consequently operation of the hatrack, i.e. opening or closing the hatrack, is facilitated.

Figure 11:
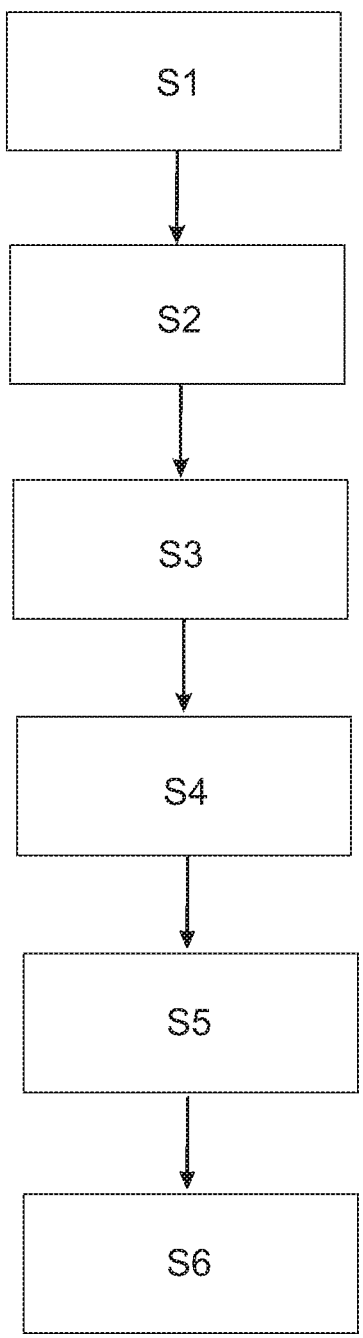
FIG. 11 shows a diagram that illustrates steps of a method according to the invention.

FIG. 11 shows a flow chart in which the steps of a method for installing a hatrack according to the invention are diagrammatically shown. It should be noted that the steps of the method are merely main steps, wherein these main steps can be differentiated or divided into sub-steps. Furthermore, it is also possible to undertake sub-steps between the main steps. A sub-step is mentioned as such only if this step is important to gain an understanding of the principles of the method according to the invention.

In detail, the following steps are significant:

In step S1 the housing of the hatrack is slid into the housing on the structure of an aircraft. In step S2 the first rollers, which are arranged on each side of the hatrack, are placed or inserted into the installation segments of the guide rails. In step S3 the hatrack is slid into the housing of the hatrack module in such a manner that the first rollers run along the installation segment, along the second guide segment and into the connection segment. In step S4 the second rollers are then inserted into the installation segments. Finally, the hatrack is further slid into the housing, wherein the first rollers finally engage the first guide segments, and the second rollers engage the second guide segments. As an additional, possible step S6, the open ends of the installation segments can be closed by means of locking plugs.

In summary, although this is a complex movement of the hatrack, maximum reduction in the number of components and savings in weight are achieved while at the same time integrating essential desired effects. In this manner the use of two rails and four bearing rollers makes it possible to achieve optimal ergonomics, to limit the required space, to achieve simple installation, dynamic damping during opening, and dynamic support of manual force during closing.

As far as installation is concerned, the design of the hatrack module makes it possible to divide the module into two components, namely the housing and the hatrack, which components can be divided in an optimized manner for installation. Installation problems and maintenance problems which occur in the conventional design are eliminated in this manner. Installation of the housing is greatly simplified as a result of the ability to access the fastening elements and adjustment elements from the front. There is no need to design the PSUs so that they are foldable, and they are mounted so as to be fixed in place before they are connected to the supply lines in the aircraft structure.

Moreover, the variability and flexibility of the service channel is maintained; test routines of the service channel are maintained; tolerance problems of the service channel in the direction of the aircraft (structure-related tolerances) can be solved with the use of tolerance panels; closed contours of the side lining, the PSC, the hatrack housing and the hatrack, to the ceiling lining, become possible; and, lastly, a design without handles is possible because of gravity-induced self-opening of the hatrack (push-to-open unlocking).

While the invention has been illustrated and described in detail in the drawings and in the above description, it is intended for such illustrations and descriptions to be merely illustrative or exemplary rather than being restrictive, so that the invention is not limited by the embodiments disclosed.

Other variations of the disclosed embodiment can be understood and caused by the average person skilled in the art, when implementing the claimed invention, from studying the drawings, the disclosure and the dependent claims. In the claims the term "comprising" does not exclude other elements or steps, and the indefinite article "a" or "an" does not exclude a plurality.

The mere fact that particular features have been mentioned in different dependent claims does not limit the subject of the invention. Furthermore, any combinations of these features can be used to advantage.

LIST OF REFERENCE CHARACTERS

100 Housing of the hatrack module
110 Fastening element
120 Locking plug
130 Bearing element
131 First guide segment
132 Connection segment
133 Second guide segment
134 Installation segment
140 Fastening rail
150 Reach-through access opening
160 Passenger service channel
170 Closing plate
180 Hatrack accommodation space
190 Valve
195 Adjusting screw
200 Hatrack
210 Hatrack wall
231 First guide element
233 Second guide segment
240 Bearing element
300 Passenger service unit (PSU)
310, 320, 330 Different PSUs
350, 360 Connections
400 Aircraft structure
410 Fastening element
420 Outside wall
430 Interior lining
450, 460 Supply lines
S Movement of the center of gravity
D Movement of the individual pivot point
M instantaneous center of rotation
MK curve of instantaneous center of rotation
U Negative-pressure reservoir
L Airflow
F Force
α Opening angle
P1, P2, P3 Movement phases

The invention claimed is:
1. A hatrack module comprising:
a housing with a hatrack accommodation space,
a first and a second guide rail arranged on each of a first and second sidewall of the hatrack accommodation space, respectively, and a hatrack with laterally arranged first and second guide elements, wherein the first and second guide elements of the hatrack comprise at least one first roller and at least one second roller, with one of the at least one first roller and one of the at least one second roller arranged on each side of the hatrack, the first and second guide elements being engagable with the first and second guide rails, respectively.

2. The hatrack module of claim 1, wherein the hatrack is movable between an open and a closed position along the first and second guide rails at least in a section solely because of its own weight force.

3. The hatrack module of claim 1, wherein each of the first and second guide rails comprises a first guide segment, a connection segment, a second guide segment and an installation segment.

4. The hatrack module of claim 3, wherein the at least one first roller is arranged to engage the first guide segments, and the at least one second roller is arranged to engage the second guide segments when the hatrack is installed in the housing.

5. The hatrack module of claim 1, further comprising a locking plug for closing off one end of a guide rail.

6. The hatrack module of claim 1, further comprising a locking device for locking the hatrack in a closed position in the housing.

7. The hatrack module of claim 1, wherein the movement path of the hatrack is determined in such a manner that in any position of the hatrack between an open position and a closed position there is an essentially constant gap between an outside of the hatrack and an edge of the housing.

8. The hatrack module of claim 1, wherein the hatrack module is configured to be integrated in a positive-locking manner in the lining of the interior of an aircraft.

9. The hatrack module of claim 1, further comprising a passenger service channel and at least one passenger service unit, wherein the at least one passenger service unit is an element selected from the group consisting of: an oxygen supply box, a loudspeaker, a headphone jack, a light, an air outlet for the air supply, a USB connector, a computer connector, and a panel.

10. An aircraft comprising a hatrack module, the hatrack module comprising:
a housing with a hatrack accommodation space,
a first and a second guide rail arranged on each of a first and second sidewall of the hatrack accommodation space, respectively, and
a hatrack with laterally arranged first and second guide elements, wherein the first and second guide elements of the hatrack comprise at least one first roller and at least one second roller, with one of the at least one first roller and one of the at least one second roller arranged on each side of the hatrack, the first and second guide elements being engagable with the first and second guide rails, respectively.

11. A method for installing a hatrack module of claim 1 in an aircraft, wherein the method comprises:
attaching the housing of the hatrack module to a structure of the aircraft,
inserting the at least one first roller into the installation segments of the first and second guide rails,
inserting the hatrack into the hatrack accommodation space, wherein the at least one first roller moves along the guide rails,
inserting the at least one second roller into the installation segments, and
further inserting the hatrack until the first at least one roller is arranged in the first guide segments, and the at least one second roller is arranged in the second guide segments.

12. The method of claim 11, further comprising:
locking the first and second guide rails.

* * * * *